United States Patent
Arakawa et al.

(10) Patent No.: US 8,102,911 B2
(45) Date of Patent: Jan. 24, 2012

(54) PICTURE CODING DEVICE

(75) Inventors: Hiroshi Arakawa, Nara (JP); Tatsuro Juri, Osaka (JP)

(73) Assignee: Panasonic Corporation, Osaka (JP)

( * ) Notice: Subject to any disclaimer, the term of this patent is extended or adjusted under 35 U.S.C. 154(b) by 1267 days.

(21) Appl. No.: 11/806,944

(22) Filed: Jun. 5, 2007

(65) Prior Publication Data

US 2007/0280353 A1      Dec. 6, 2007

(30) Foreign Application Priority Data

Jun. 6, 2006 (JP) ................................. 2006-157224

(51) Int. Cl.
    *H04N 7/12* (2006.01)
(52) U.S. Cl. ........................ 375/240; 348/699
(58) Field of Classification Search ........... 375/240.01–240.16, 240.24, 240; 348/699
    See application file for complete search history.

(56) References Cited

U.S. PATENT DOCUMENTS

| | | | | |
|---|---|---|---|---|
| 5,974,196 A * | 10/1999 | Chang et al. | .................. | 382/268 |
| 6,005,981 A * | 12/1999 | Ng et al. | .................. | 382/240 |
| 6,064,324 A * | 5/2000 | Shimizu et al. | .................. | 341/50 |
| RE36,761 E * | 7/2000 | Fujiwara | .................. | 375/240.03 |
| 6,812,865 B2 * | 11/2004 | Saunders | .................. | 341/51 |
| 7,292,165 B2 * | 11/2007 | Cha et al. | .................. | 341/107 |
| 2003/0081850 A1 * | 5/2003 | Karczewicz et al. | ......... | 382/247 |
| 2004/0202245 A1 * | 10/2004 | Murakami et al. | ............ | 375/240 |
| 2005/0249289 A1 * | 11/2005 | Yagasaki et al. | ......... | 375/240.18 |
| 2006/0256857 A1 * | 11/2006 | Chin | ........................ | 375/240.03 |
| 2007/0133892 A1 | 6/2007 | Chiba et al. | | |

FOREIGN PATENT DOCUMENTS

| | | |
|---|---|---|
| JP | 2004-135251 | 4/2004 |
| JP | 2006-093777 | 4/2006 |
| JP | 2007-142637 | 6/2007 |
| JP | 2007-158430 | 6/2007 |
| JP | 2007-166039 | 6/2007 |
| WO | 2004/034330 | 4/2004 |

* cited by examiner

*Primary Examiner* — Saleh Najjar
*Assistant Examiner* — Joseph Pan
(74) *Attorney, Agent, or Firm* — Wenderoth, Lind & Ponack, L.L.P.

(57) ABSTRACT

A picture coding device includes a motion prediction unit, an intra picture prediction unit, and an input selection unit. The input selection unit selects a smaller one of a motion total obtained by adding a motion residual and a value into which a motion vector is coded and an intra picture total obtained by adding an intra picture residual and a value into which a prediction mode is coded. The device further includes an I_PCM judgment unit comparing a cost with a first threshold value. Additionally, the device includes an output selection unit selecting coded data obtained by arithmetic coding as data to be outputted to the outside if the cost is equal to or less than the first threshold value and selecting I_PCM data as the data to be outputted to the outside if the cost is larger than the first threshold value.

20 Claims, 7 Drawing Sheets

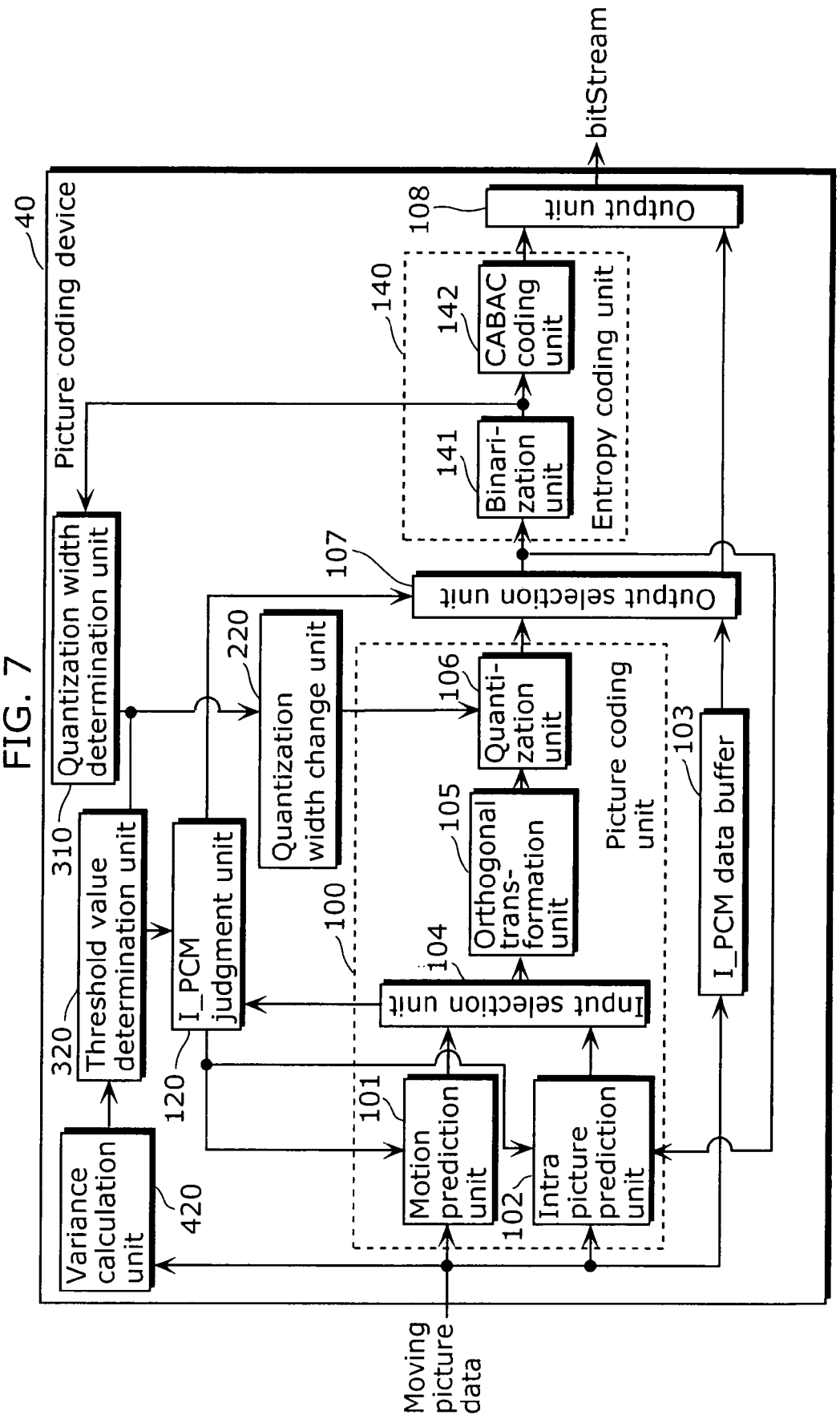

PICTURE CODING DEVICE

BACKGROUND (1) Field of the Invention

The invention relates to a picture coding device that codes moving picture data in compliance with the H.264/AVC standard.

(2) Description of the Related Art

Data compression techniques defined in the H.264/AVC standard include entropy coding (variable length coding). For entropy coding methods, there are two methods available, the Context-based Adaptive Variable Length Coding (CAVLC) and the Context-based Adaptive Binary Arithmetic Coding (CABAC). CABAC is a method for performing entropy coding at the best compression mode, by performing adjustment such that the frequencies of occurrence of objects to be coded that change with time coincide with the probabilities of symbols at the time of coding.

CABAC coding is mainly divided into two processes. The first is a process called binarization that converts multi-valued data to be coded which is called syntax into binary data. The second is a process of calculating a context for the binary data obtained by binarization and performing arithmetic coding.

In arithmetic coding, coding processing is performed while obtaining the probabilities of "0" and "1" for each bit of binary data. At the same time, the probabilities are updated. As described above, since arithmetic coding is a bit-by-bit process, the processing rate of arithmetic coding is generally 1 bit per clock. Also, since probabilities are adaptively switched on a bit-by-bit basis, and the probabilities for each bit are updated with the value of the bit, it is difficult to precisely know the amount of code obtained by arithmetic coding before the arithmetic coding.

In the H.264/AVC standard, if the 4:2:0 format is adopted, and the luminance and chrominance of each pixel are each represented by 8 bits, the maximum amount of code of one macroblock is 3,200 bits. If the amount of code as the result of coding one macroblock exceeds 3,200 bits, it is necessary to change coding conditions and code the macroblock again. To cope with the case where the amount of code exceeds 3,200 bits, there is also available a method for selecting I_PCM as mb_type and selecting I_PCM data instead of coded data. Since it is difficult to precisely know the amount of code obtained by CABAC until coded data is actually obtained, a judgment as to whether the maximum amount of code of a macroblock to be coded is equal to or less than a limit is made after CABAC coding.

There is also disclosed a technique for monitoring the amount of data input to an arithmetic coding unit and, if the amount of data of a certain unit of processing exceeds a threshold value, selecting one of coded data obtained by performing arithmetic coding for input data that is obtained using a parameter different from one used when the input data is obtained and uncompressed data, as data to be outputted by a picture coding device.

FIG. 1 is a block diagram showing the functional configuration of a conventional picture coding device 50.

The conventional picture coding device 50 is a device that codes input picture data and outputs a bitstream. An overview of the operation of the picture coding device 50 will be described below. The term "picture data" here refers to moving picture-related data including substantial data such as macroblock data constituting a moving picture, control information such as a macroblock type (mb_type), or other attribute information.

Data of a moving picture to be coded is inputted to a motion prediction unit 51, an intra picture prediction unit 52, and an I_PCM data buffer 53. The motion prediction unit 51 detects a block that is similar to a block to be coded among pictures other than a picture containing the block to be coded, obtains a differential image between the block to be coded and the detected block, and outputs the differential image and a motion vector to an input selection unit 54. The intra picture prediction unit 52 predicts an image of a block to be coded within a picture using an image of a block adjacent thereto, obtains a differential image between the image of the block to be coded and the predicted image, and outputs the differential image and a prediction mode to the input selection unit 54. The I_PCM data buffer 53 holds I_PCM data that is the original image data of the input moving image.

The input selection unit 54 selects one smaller in amount of data from the motion prediction unit 51 and data from the intra picture prediction unit 52. An orthogonal transformation unit 55 performs a discrete cosine transform (DCT), which is a type of orthogonal transformation, on the data selected by the input selection unit 54. A quantization unit 56 quantizes a DCT coefficient obtained by the orthogonal transformation unit 55. A binarization unit 57 binarizes a quantized DCT coefficient, a CABAC coding unit 59 performs arithmetic coding for binary data obtained by binarization, and an output buffer 60 holds the data having undergone arithmetic coding (coded data).

An I_PCM judgment unit 58 judges whether the amount of binary data outputted from the binarization unit 57 is equal to or less than a first threshold value and judges whether the amount of coded data outputted from the CABAC coding unit 59 is equal to or less than a second threshold value (e.g., 3,200 bits). If the amount of binary data is equal to or less than the first threshold value and the amount of coded data is equal to or less than the second threshold value, the I_PCM judgment unit 58 determines to select the coded data obtained by the CABAC coding unit 59 as a bitstream outputted by the picture coding device 50. On the other hand, if the amount of binary data is larger than the first threshold value or the amount of coded data is larger than the second threshold value, the I_PCM judgment unit 58 determines to select I_PCM data held by the I_PCM data buffer 53 as a bitstream outputted by the picture coding device 50. An output selection unit 61 outputs the coded data or I_PCM data to outside the picture coding device 50 in accordance with the determination made by the I_PCM judgment unit 58.

The above description is given in Patent Reference, Japanese Unexamined Patent Application Publication No. 2004-135251.

However, in the H.264/AVC standard, when motion prediction and intra picture prediction are performed for a macroblock to be processed, information of a macroblock preceding the macroblock to be processed is used. Accordingly, if a judgment as to whether the maximum amount of code of the macroblock to be processed is equal to or less than a limit is made after CABAC, as is conventionally done, it is impossible to perform motion prediction and intra picture prediction for a macroblock following the macroblock to be processed until CABAC coding of the macroblock to be processed ends. That is, a conventional picture coding device has the problem that it is incapable of processing picture data at high speed (in real time).

SUMMARY

An aspect of the invention provides a picture coding device that can perform entropy coding and processes picture data at high speed, in consideration of the above-described problem.

The picture coding device according to an aspect of the invention is a picture coding device that codes picture data, and includes: a motion prediction unit that selects, among pictures, a reference image for which a sum of absolute differences between pixels of an input image and pixels of the reference image is the smallest, and detects a motion vector of the input image with respect to the reference image; an intra picture prediction unit that selects, within a picture, a prediction image for which a sum of absolute differences between pixels of an input image and pixels of the prediction image is the smallest, and specify a prediction mode for generating the prediction image; an input selection unit that compares a motion total with an intra picture total, and selects a smaller one of the motion total and the intra picture total, the motion total being obtained by adding a motion residual indicating a difference between an input image and a reference image and a value into which the motion vector is coded, the intra picture total being obtained by adding an intra picture residual indicating a difference between an input image and a prediction image and a value into which the prediction mode is coded; an orthogonal transformation unit that orthogonally transforms a differential image that is formed with differences between pixels of an input image and pixels of a reference image or between pixels of an input image and pixels of a prediction image, the reference image or the prediction image corresponding to the total selected by the input selection unit; a quantization unit that quantizes a value that is obtained by the orthogonal transformation unit; a binarization unit that binarizes a value that is obtained by the quantization unit; an arithmetic coding unit that arithmetically codes binary data that is obtained by the binarization unit; a buffer that holds I_PCM data corresponding to an input image; a comparison unit that compares, with a first threshold value, a cost that is the smaller one of the motion total and the intra picture total; an output selection unit that selects coded data obtained by the arithmetic coding unit as data to be outputted to outside the picture coding device when the cost is equal to or less than the first threshold value, and selects the I_PCM data held by the buffer as the data to be outputted to outside the picture coding device when the cost is larger than the first threshold value; and
an output unit that outputs the coded data or the I_PCM data to outside the picture coding device in accordance with selection by the output selection unit.

The picture coding device according to an aspect of the invention further includes a quantization width change unit that compares the cost with a second threshold value that is smaller than the first threshold value, and increases a quantization width used by the quantization unit when the cost is larger than the second threshold value and is equal to or less than the first threshold value, wherein it is possible that the quantization unit quantizes a value that is obtained by the orthogonal transformation unit using the quantization width based on control of the quantization width change unit.

The picture coding device according to an aspect of the invention further includes a quantization width determination unit that compares, with a third threshold value, an amount of the binary data that is obtained by the binarization unit and determines a quantization width used by the quantization unit depending on a magnitude relationship between the amount of binary data and the third threshold value; and a threshold value determination unit that determines the first threshold value depending on the quantization width determined by the quantization width determination unit, wherein it is possible that the comparison unit compares the cost with the first threshold value determined by the threshold value determination unit, and the quantization unit quantizes the value that is obtained by the orthogonal transformation unit using the quantization width determined by the quantization width determination unit.

The picture coding device according to an aspect of the invention further includes a variance calculation unit that calculates at least one of a luminance variance of the input picture and a chrominance variance of the input picture, wherein it is possible that the threshold value determination unit determines the first threshold value using a value that is obtained by the variance calculation unit.

It is possible to realize a content transmission method including steps into which the characteristic component units of the picture coding device in an aspect of the invention are converted, realize a program for causing a computer to execute the steps, and realize an integrated circuit including the characteristic component units. The above-described program can be distributed through a recording medium such as a CD-ROM or a transmission medium such as a communication network.

The invention can perform entropy coding and provide a picture coding device that processes picture data at high speed.

A picture coding device according to an aspect of the invention selects either coded data or I_PCM data as data to be outputted to outside the picture coding device depending on the result of comparing a cost that is a smaller one of a motion total and an intra picture total with a first threshold value. For this reason, a motion prediction unit and an intra picture prediction unit, an input selection unit, an orthogonal transformation unit, and a quantization unit can perform pipeline processing.

The disclosure of Japanese Patent Application No. 2006-157224 filed on Jun. 6, 2006 including specification, drawings and claims is incorporated herein by reference in its entirety.

BRIEF DESCRIPTION OF THE DRAWINGS

Advantages and features of the invention will become apparent from the following description thereof taken in conjunction with the accompanying drawings that illustrate embodiments of the invention. In the Drawings:

FIG. 7 is a configuration diagram of a picture coding device 40 in accordance with an embodiment of the invention.

DETAILED DESCRIPTION

The best mode for carrying out the invention will be described below with reference to the drawings.

The configuration of a picture coding device 10 in accordance with an embodiment of the invention will be described using FIG. 2.

Figure 1:
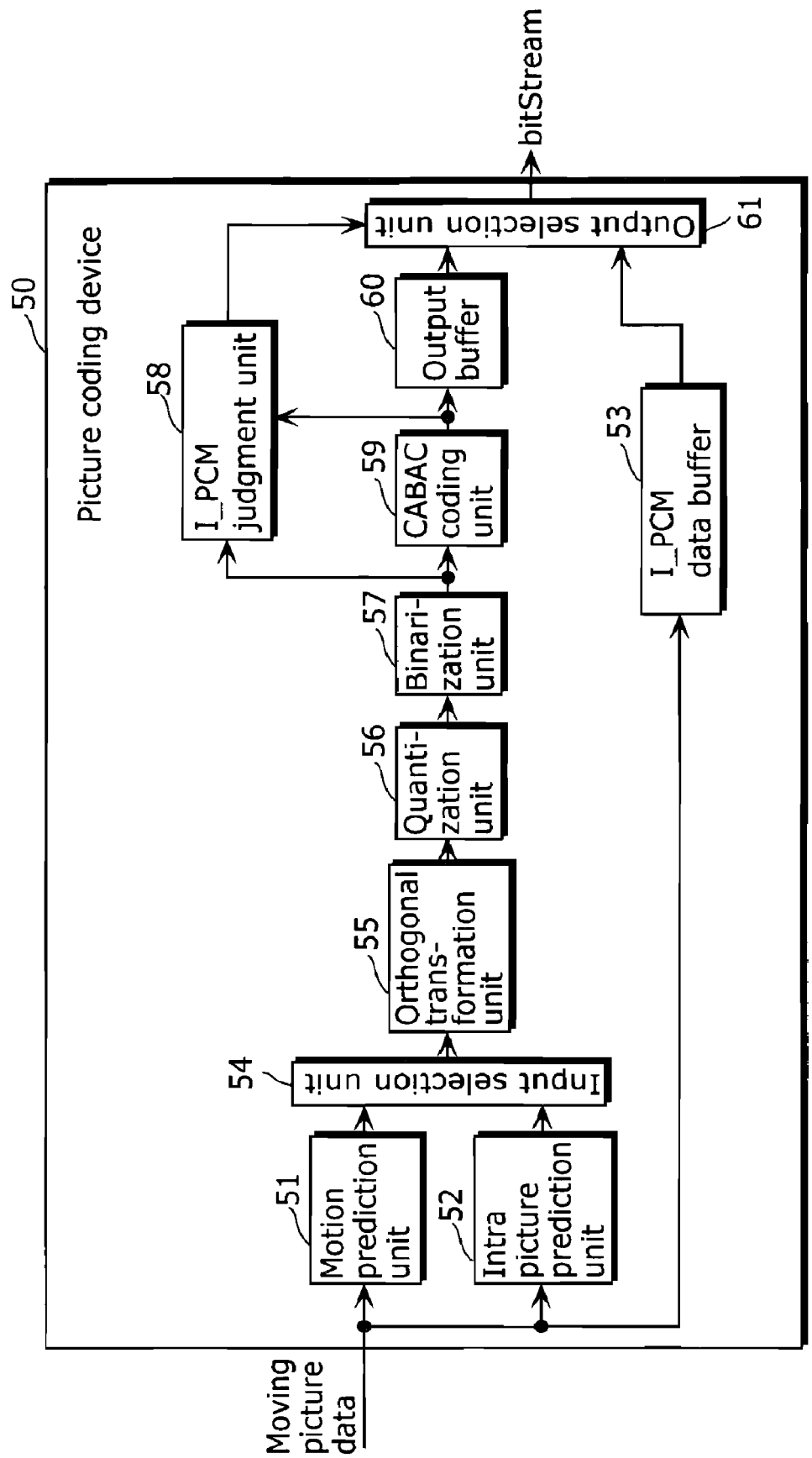
FIG. 1 is a configuration diagram of a conventional picture coding device 50.
Figure 2:
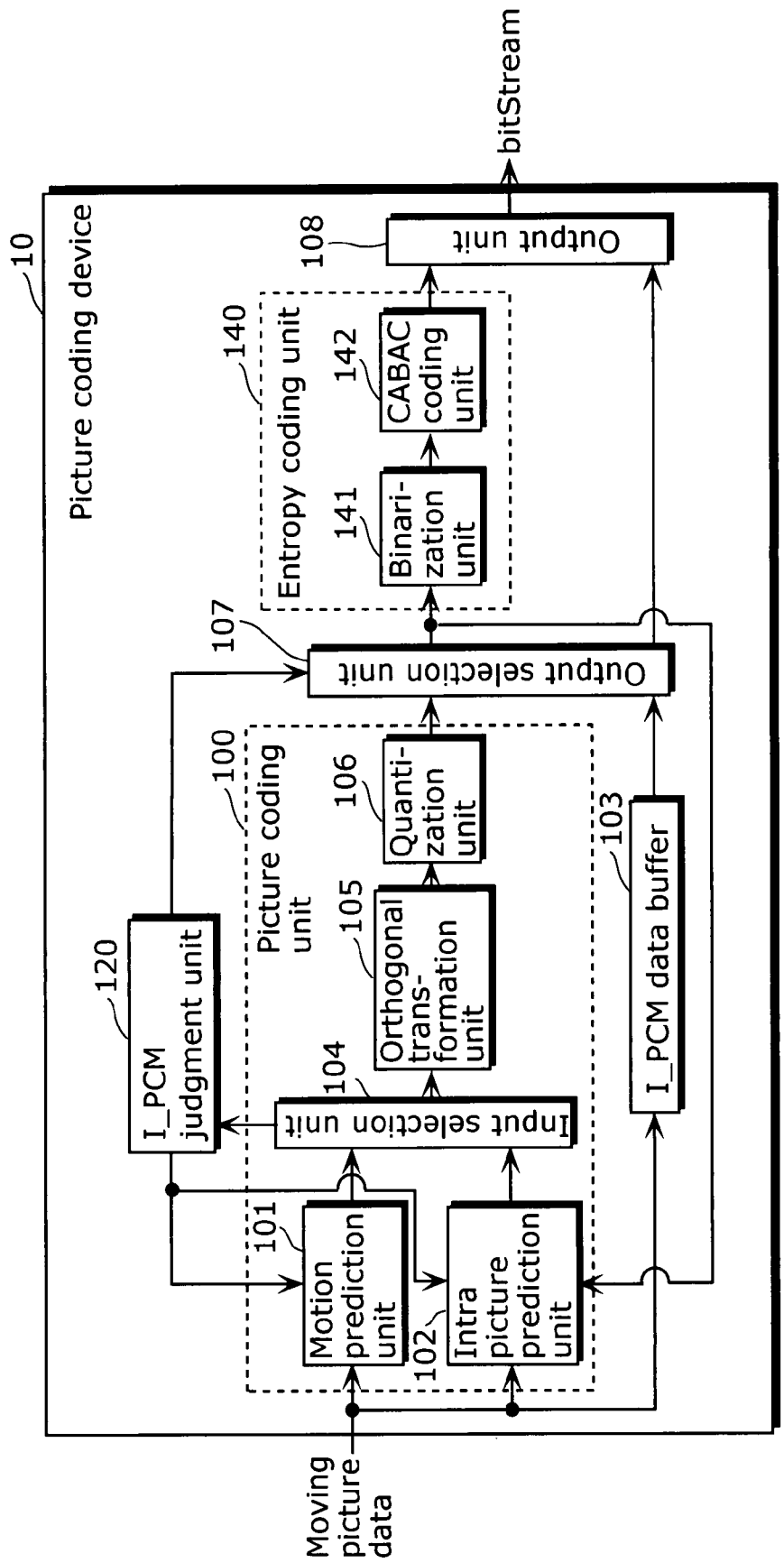
FIG. 2 is a configuration diagram of a picture coding device 10 in accordance with an embodiment of the invention.

FIG. 2 is a configuration diagram of the picture coding device 10. The picture coding device 10 is a device that codes input moving picture data and outputs a bitstream and includes a picture coding unit 100, an I_PCM data buffer 103, an I_PCM judgment unit 120, an output selection unit 107, an entropy coding unit 140, and an output unit 108.

The picture coding unit 100 is a component that codes input picture data and has a motion prediction unit 101, an intra picture prediction unit 102, an input selection unit 104, an orthogonal transformation unit 105, and a quantization unit 106.

Among pictures, the motion prediction unit 101 selects a reference macroblock for which the sum of absolute differences between pixels of macroblocks to be coded, which are included in the input picture data, and pixels of the reference macroblock is the smallest, and detects a motion vector of the macroblock to be coded with respect to the reference macroblock. The motion prediction unit 101 detects differences between the pixels of the macroblock to be coded and the pixels of the reference macroblock. For the sake of descriptive simplicity, an image formed with differences between the pixels will be referred to as a "motion differential image" hereinafter. The sum of absolute differences between the pixels of the macroblock to be coded and the pixels of the reference macroblock will be referred to as a "motion absolute sum." The macroblock to be coded is an example of an input picture to be processed by a motion prediction unit of the picture coding device of the invention, and the reference macroblock is an example of a reference picture to be processed by the motion prediction unit of the picture coding device of the invention.

Within a picture, the intra picture prediction unit 102 selects one of a plurality of candidate prediction macroblocks for which the sum of absolute differences between pixels of the macroblocks to be coded, which are included in the input picture data is the smallest, and specifies a prediction mode for generating the prediction macroblock. The intra picture prediction unit 102 detects the differences between the pixels of the macroblock to be coded and the pixels of the prediction macroblock. For the sake of descriptive simplicity, a picture formed with the differences between the pixels will be referred to as an "intra picture differential image" hereinafter. The sum of absolute differences between the pixels of the macroblock to be coded and the pixels of the prediction macroblock will be referred to as an "intra picture absolute sum." The macroblock to be coded is an example of an input picture to be processed by an intra picture prediction unit of the picture coding device of the invention, and the prediction macroblock is an example of a prediction picture to be processed by the intra picture prediction unit of the picture coding device of the invention.

The input selection unit 104 compares a motion total with an intra picture total, and selects a smaller one of the motion total and the intra picture total. The motion total is obtained by adding a value into which a motion vector is coded and a motion absolute sum, and the intra picture total is obtained by adding a value into which a prediction mode is coded and an intra picture absolute sum. If the input selection unit 104 selects the motion total, it outputs a motion differential picture to the orthogonal transformation unit 105 and outputs the motion total as a cost to the I_PCM judgment unit 120. If the input selection unit 104 selects the intra picture total, it outputs an intra picture differential image to the orthogonal transformation unit 105 and outputs the intra picture total as the cost to the I_PCM judgment unit 120.

The orthogonal transformation unit 105 orthogonally transforms a differential image (motion differential image or intra picture differential image) from the input selection unit 104. For example, the orthogonal transformation unit 105 performs a discrete cosine transform (DCT) on the differential image from the input selection unit 104. The quantization unit 106 quantizes a value (e.g., a DCT coefficient) obtained by the orthogonal transformation unit 105.

The I_PCM data buffer 103 holds I_PCM data corresponding to an input picture.

The I_PCM judgment unit 120 holds a first threshold value for judging whether the amount of code of one macroblock exceeds a predetermined amount, e.g., 3,200 bits and compares a cost from the input selection unit 104 with the first threshold value. The I_PCM judgment unit 120: (A) instructs the output selection unit 107 to select data obtained by the quantization unit 106 if the cost from the input selection unit 104 is equal to or less than the first threshold value; and (B) instructs the output selection unit 107 to select I_PCM data held in the I_PCM data buffer 103 if the cost from the input selection unit 104 is larger than the first threshold value.

In accordance with an instruction from the I_PCM judgment unit 120, the output selection unit 107 selects one of data obtained by the quantization unit 106 and I_PCM data held in the I_PCM data buffer 103 and outputs the selected data to the entropy coding unit 140.

The entropy coding unit 140 is a component that performs arithmetic coding for data from the output selection unit 107 and has a binarization unit 141 and a CABAC coding unit 142. The binarization unit 141 binarizes the data from the output selection unit 107, and the CABAC coding unit 142 performs arithmetic coding for binary data obtained by the binarization unit 141.

The output unit 108 outputs one of data having undergone arithmetic coding (coded data) from the entropy coding unit 140 and I_PCM data from the output selection unit 107 to outside the picture coding device 10.

Note that the motion prediction unit 101 is an example of the motion prediction unit of the picture coding device of the invention, the intra picture prediction unit 102 is an example of the intra picture prediction unit of the picture coding device of the invention, and the input selection unit 104 is an example of an input selection unit of the picture coding device of the invention. The orthogonal transformation unit 105 is an example of an orthogonal transformation unit of the picture coding device of the invention, the quantization unit 106 is an example of a quantization unit of the picture coding device of the invention, and the binarization unit 141 is an example of a binarization unit of the picture coding device of the invention. The CABAC coding unit 142 is an example of an arithmetic coding unit of the picture coding device of the invention, the I_PCM data buffer 103 is an example of a buffer of the picture coding device of the invention, and the I_PCM judgment unit 120 is an example of a comparison unit of the picture coding device of the invention. The output selection unit 107 is an example of an output selection unit of the picture coding device of the invention, and the output unit 108 is an example of an output unit of the picture coding device of the invention.

The operation of the picture coding device 10 according to an embodiment of the invention will be described additionally using FIG. 3.

Figure 3:
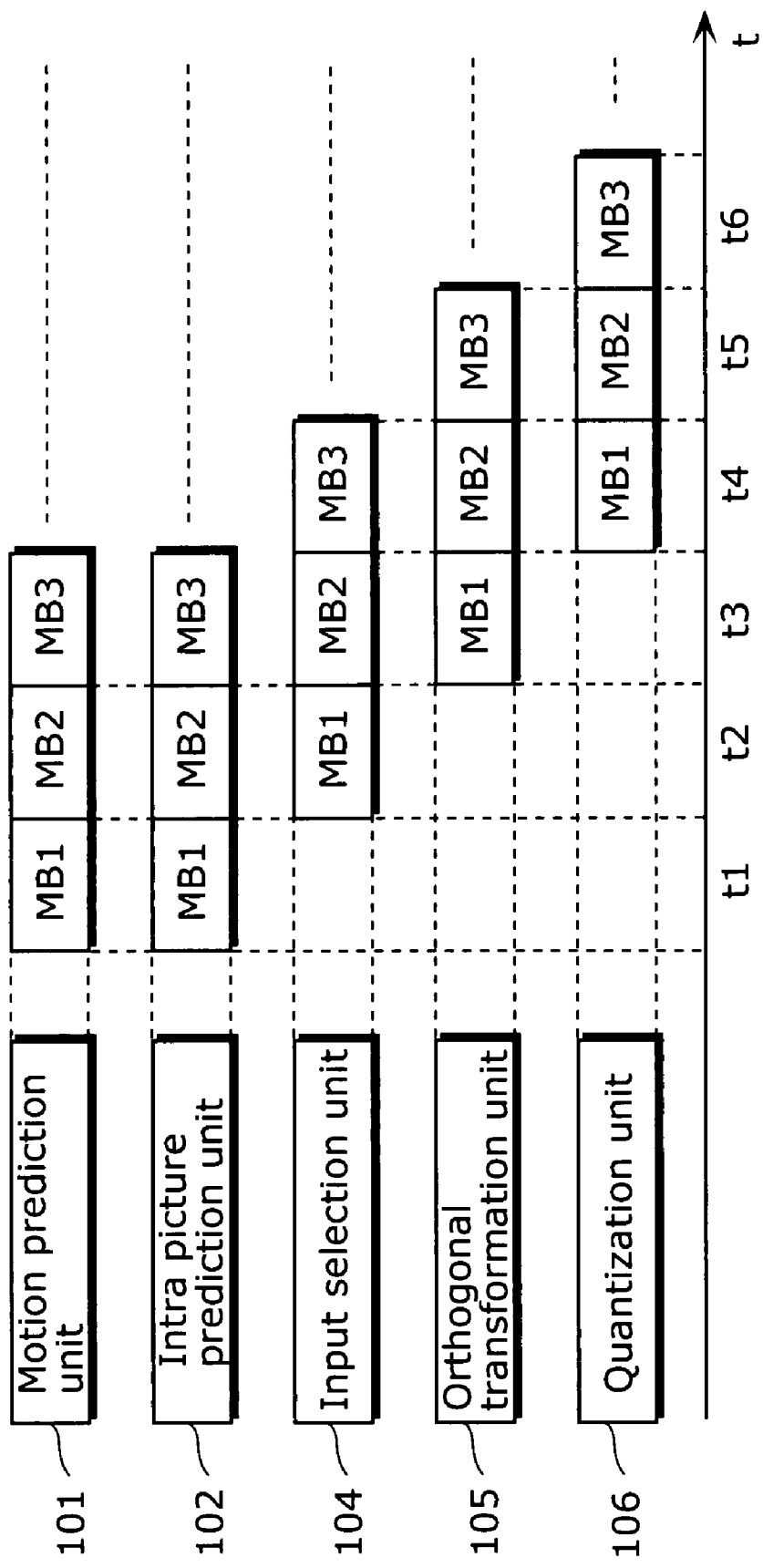
FIG. 3 is a chart for explaining pipeline processing in accordance with an embodiment of the invention.

FIG. 3 is a chart showing times at which the motion prediction unit 101, intra picture prediction unit 102, input selection unit 104, orthogonal transformation unit 105, and quantization unit 106 constituting the picture coding unit 100 operate on macroblocks to be coded (MB1, MB2, and MB3). Assume here that the macroblock MB1 to be coded is processed first, the macroblock MB2 to be coded is processed second, and the macroblock MB3 to be coded is processed third.

At time t1, the motion prediction unit 101 selects a reference macroblock for which the sum of absolute differences between the pixels of the macroblock MB1 to be coded and the pixels of the reference macroblock is the smallest and detects a motion vector of the macroblock MB1 to be coded with respect to the reference macroblock. The motion prediction unit 101 also detects differences between the pixels of the macroblock MB1 to be coded and the pixels of the reference macroblock. In addition, the motion prediction unit 101 calculates a motion absolute sum that is the sum of absolute differences between the pixels of the macroblock MB1 to be coded and the pixels of the reference macroblock, and calculates a motion total obtained by adding a value into which the detected motion vector is coded and the motion absolute sum. The motion prediction unit 101 outputs, to the input selection unit 104, an image (motion differential image) that is formed with the differences between the pixels of the macroblock MB1 to be coded and the pixels of the reference macroblock, the motion vector of the macroblock MB1 to be coded, and the motion total of the macroblock MB1 to be coded.

At time t1, the intra picture prediction unit 102 selects, as a prediction macroblock, one of a plurality of candidate prediction macroblocks for which the sum of absolute differences between pixels of the macroblocks to be coded, which are included in the input picture data and pixels of the macroblock MB1 to be coded, and specifies a prediction mode for generating the prediction macroblock. The intra picture prediction unit 102 also detects differences between the pixels of the macroblock MB1 to be coded and the pixels of the prediction macroblock. In addition, the intra picture prediction unit 102 calculates an intra picture absolute sum that is the sum of absolute differences between the pixels of the macroblock MB1 to be coded and the pixels of the prediction macroblock, and calculates an intra picture total obtained by adding a value into which the specified prediction mode is coded and the intra picture absolute sum. The intra picture prediction unit 102 outputs, to the input selection unit 104, an image (intra picture differential image) that is formed with the differences between the pixels of the macroblock MB1 to be coded and the pixels of the prediction macroblock, the prediction mode of the macroblock MB1 to be coded, and the intra picture total of the macroblock MB1 to be coded.

At time t1, the I_PCM data buffer 103 holds I_PCM data of the macroblock MB1 to be coded.

In the first half of time t2, the input selection unit 104 compares the motion total of the macroblock MB1 to be coded from the motion prediction unit 101 with the intra picture total of the macroblock MB1 to be coded from the intra picture prediction unit 102 and selects a smaller one of the motion total and the intra picture total. If the input selection unit 104 selects the motion total, it outputs the motion total of the macroblock MB1 to be coded as a cost to the I_PCM judgment unit 120 and outputs the motion differential picture of the macroblock MB1 to be coded to the orthogonal transformation unit 105. If the input selection unit 104 selects the intra picture total, it outputs the intra picture total of the macroblock MB1 to be coded as the cost to the I_PCM judgment unit 120 and outputs the intra differential picture of the macroblock MB1 to be coded to the orthogonal transformation unit 105.

In the first half of time t2, the I_PCM judgment unit 120 compares the cost from the input selection unit 104 with a first threshold value, instructs the output selection unit 107 to select quantized data of the macroblock MB1 to be coded that is obtained by the quantization unit 106 if the cost is equal to or less than the first threshold value and instructs the output selection unit 107 to select the I_PCM data of the macroblock MB1 to be coded that is held in the I_PCM data buffer 103 if the cost is larger than the first threshold value. The I_PCM judgment unit 120 also outputs the comparison result to the motion prediction unit 101 and the intra picture prediction unit 102. If the input selection unit 104 selects the intra picture total of the macroblock MB1 to be coded, the macroblock type (mb_type) of the prediction macroblock for the macroblock MB1 to be coded is determined in the first half of time t2, and thus the intra picture prediction unit 102 can perform the same processing as the processing (intra picture prediction processing), having been performed for the macroblock MB1 to be coded at time t1, for a macroblock MB2 to be coded in the second half of time t2.

At time t2, the motion prediction unit 101 performs the same processing as the processing (motion prediction processing), having been performed for the macroblock MB1 to be coded at time t1, for the macroblock MB2 to be coded.

In the second half of time t2, the intra picture prediction unit 102 performs intra picture prediction processing for the macroblock MB2 to be coded.

At time t2, the I_PCM data buffer 103 holds I_PCM data of the macroblock MB2 to be coded.

In the first half of time t3, the input selection unit 104 and I_PCM judgment unit 120 perform the processing (selection processing and comparison processing), having been performed for the macroblock MB1 to be coded in the first half of time t2, for the macroblock MB2 to be coded.

At time t3, the motion prediction unit 101 performs motion prediction processing for a macroblock MB3 to be coded. In the second half of time t3, the intra picture prediction unit 102 performs intra picture prediction processing for the macroblock MB3 to be coded.

At time t3, the orthogonal transformation unit 105 orthogonally transforms the differential image (motion differential image or intra picture differential image) of the macroblock MB1 to be coded from the input selection unit 104.

At time t3, the I_PCM data buffer 103 holds I_PCM data of the macroblock MB3 to be coded.

At time t4, the motion prediction unit 101 performs motion prediction processing for a macroblock MB4 to be coded. In the first half of time t4, the input selection unit 104 and I_PCM judgment unit 120 perform selection processing and comparison processing for the macroblock MB3 to be coded. In the second half of time t4, the intra picture prediction unit 102 performs intra picture prediction processing for the macroblock MB4 to be coded. At time t4, the orthogonal transformation unit 105 orthogonally transforms a differential image (motion differential image or intra picture differential image) of the macroblock MB1 to be coded from the input selection unit 104, and the quantization unit 106 quantizes a value (e.g., a DCT coefficient) for the macroblock MB1 to be coded obtained by the orthogonal transformation unit 105. The I_PCM data buffer 103 holds I_PCM data of the macroblock MB4 to be coded.

After that, as in the above-described case, the motion prediction unit 101, intra picture prediction unit 102, input selection unit 104, orthogonal transformation unit 105, and quantization unit 106 constituting the picture coding unit 100 each process a macroblock MB to be coded by pipelining on a time-by-time basis.

For example, at time t5, the motion prediction unit 101 performs motion prediction processing for the macroblock MB5 to be coded, and the intra picture prediction unit 102 performs intra picture prediction processing for the macroblock MB5 to be coded. The input selection unit 104 and I_PCM judgment unit 120 perform selection processing and comparison processing for the macroblock MB4 to be coded.

The orthogonal transformation unit 105 orthogonally transforms a differential image (motion differential image or intra picture differential image) of the macroblock MB3 to be coded from the input selection unit 104, and the quantization unit 106 quantizes a value for the macroblock MB2 to be coded obtained by the orthogonal transformation unit 105. The I_PCM data buffer 103 holds I_PCM data of the macroblock MB5 to be coded.

After the quantization unit 106 performs quantization processing for each macroblock to be coded, the output selection unit 107 selects, for the macroblock to be coded, one of data obtained by the quantization unit 106 and I_PCM data held in the I_PCM data buffer 103 in accordance with an instruction from the I_PCM judgment unit 120. If the output selection unit 107 selects the data obtained by the quantization unit 106, it outputs the data to the entropy coding unit 140. The output selection unit 107 also outputs the selection result to the output unit 108.

In the entropy coding unit 140, the binarization unit 141 binarizes the data from the output selection unit 107, and the CABAC coding unit 142 performs arithmetic coding for binary data obtained by the binarization unit 141.

In accordance with the selection result from the output selection unit 107, the output unit 108 outputs one of the data having undergone arithmetic coding (coded data) from the entropy coding unit 140 and the I_PCM data from the output selection unit 107 to outside the picture coding device 10.

As described above, in the first half of each time, the I_PCM judgment unit 120 compares a cost from the input selection unit 104 with the first threshold value, instructs the output selection unit 107 to select quantized data of the macroblock MB1 to be coded obtained by the quantization unit 106 if the cost is equal to or less than the first threshold value, and instructs the output selection unit 107 to select I_PCM data of the macroblock MB1 to be coded held in the I_PCM data buffer 103 if the cost is larger than the first threshold value. That is, the I_PCM judgment unit 120 instructs the output selection unit 107 to select the coded data as data to be outputted to outside the picture coding device 10 if the cost is equal to or less than the first threshold value and instructs the output selection unit 107 to select the I_PCM data as the data to be outputted to outside the picture coding device 10 if the cost is larger than the first threshold value. For this reason, the motion prediction unit 101, intra picture prediction unit 102, input selection unit 104, orthogonal transformation unit 105, and quantization unit 106 constituting the picture coding unit 100 can each process a macroblock MB to be coded by pipelining on a time-by-time basis. As a result, the picture coding device 10 that performs entropy coding can process picture data at high speed.

In the above-described embodiment, a motion absolute sum that is the sum of absolute differences between pixels of a macroblock to be coded and pixels of a reference macroblock is used as an example of a motion residual indicating the difference between the macroblock to be coded and the reference macroblock. However, a motion residual may be a value that is obtained by subjecting a motion differential picture to spatial frequency conversion. Similarly, an intra picture absolute sum that is the sum of absolute differences between pixels of the macroblock to be coded and pixels of the reference macroblock is used as an example of an intra picture residual indicating the difference between the macroblock to be coded and the prediction macroblock. However, an intra picture residual may be a value that is obtained by subjecting an intra picture differential image to spatial frequency conversion. Both or one of a motion residual and an intra picture residual may be obtained by the input selection unit 104.

Figure 4:
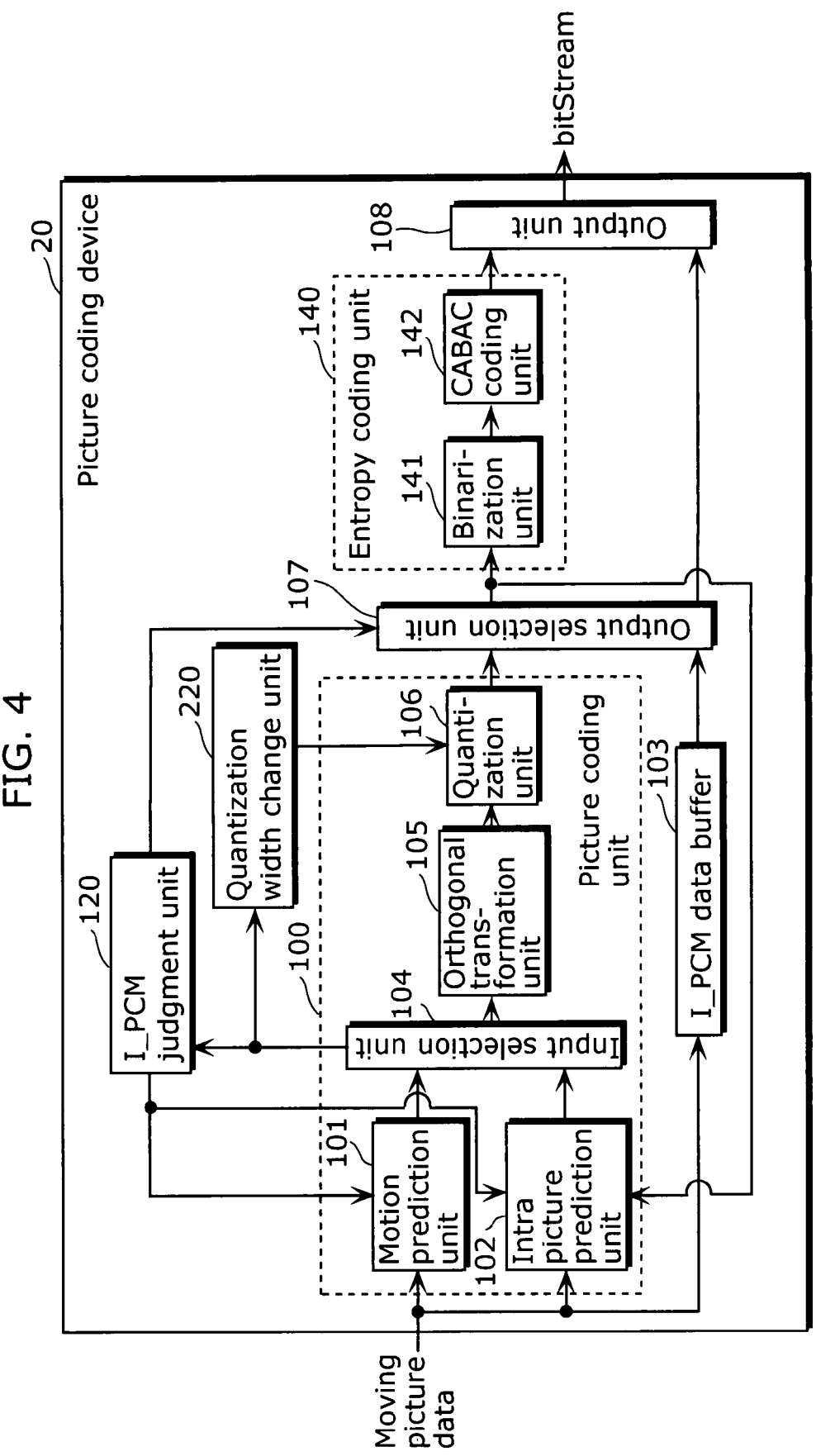
FIG. 4 is a configuration diagram of a picture coding device 20 in accordance with an embodiment of the invention.

As shown in FIG. 4, the picture coding device 10 may be replaced with a picture coding device 20. The picture coding device 20 includes a quantization width change unit 220 in addition to the components that the picture coding device 10 includes. The quantization width change unit 220 holds a second threshold value that is smaller than a first threshold value held by the I_PCM judgment unit 120, compares a cost from the input selection unit 104 with the second threshold value, and increases a quantization width used by the quantization unit 106 if the cost is larger than the second threshold value and is equal to or less than the first threshold value. The quantization unit 106 performs quantization processing with a quantization width based on the control of the quantization width change unit 220. This makes it possible to reduce the amount of quantized data that is obtained by the quantization unit 106.

Figure 5:
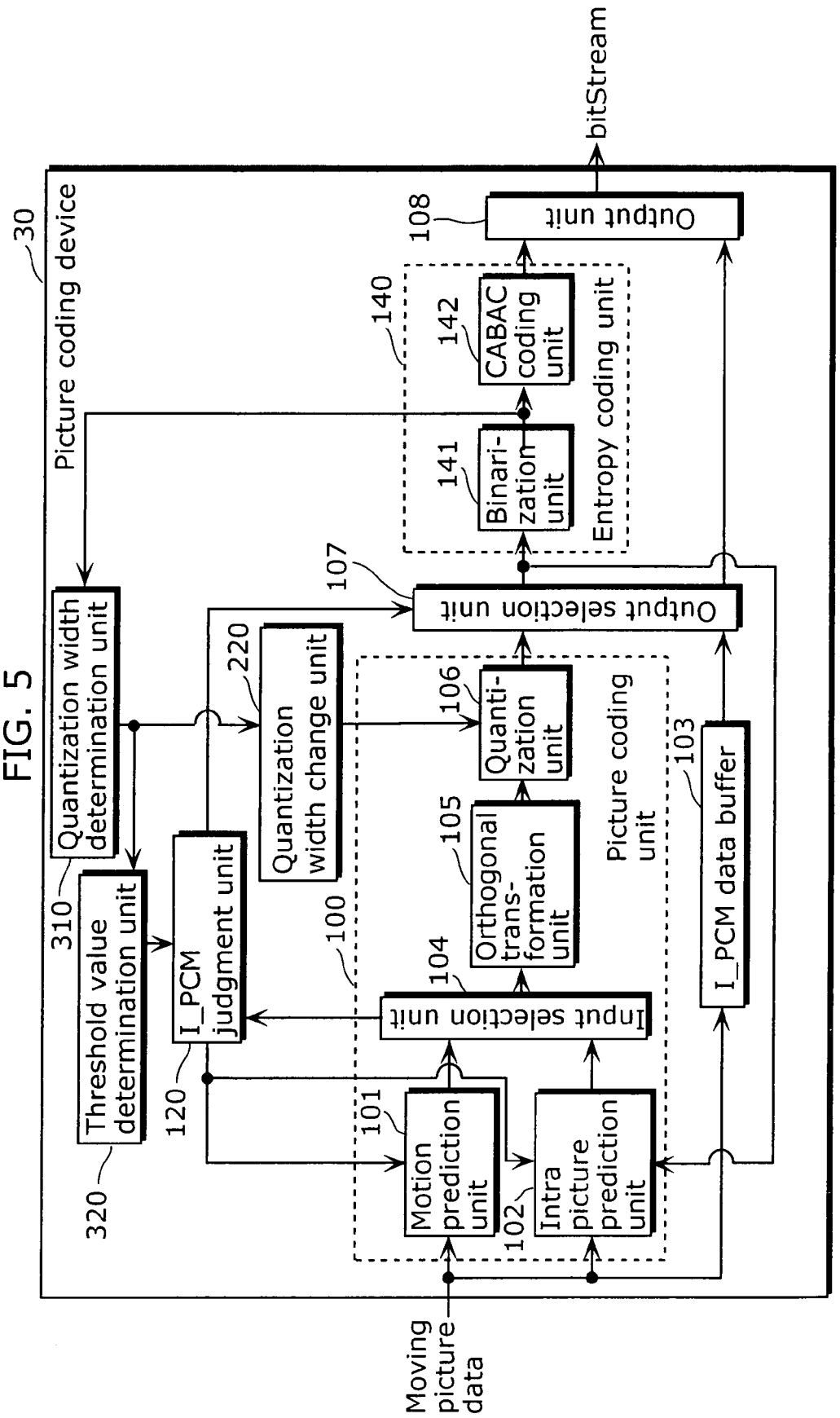
FIG. 5 is a configuration diagram of a picture coding device 30 in accordance with an embodiment of the invention.
Figure 6:
FIG. 6 is a chart showing data used by an I_PCM judgment unit 120 to determine a first threshold value in accordance with an embodiment of the invention.

As shown in FIG. 5, the picture coding device 10 may be replaced with a picture coding device 30. The picture coding device 30 includes the quantization width change unit 220, a quantization width determination unit 310, and a threshold value determination unit 320, in addition to the components that the picture coding device 10 includes. The quantization width determination unit 310 holds a third threshold value (target code amount), monitors the amount of binary data that is obtained by the binarization unit 141, compares the amount of binary data with the third threshold value, and determines a quantization width used by the quantization unit 106 depending on the magnitude relationship between the amount of binary data and the third threshold value. For example, if the amount of binary data is larger than the third threshold value, the quantization width determination unit 310 increases the quantization width used by the quantization unit 106 and reduces the amount of binary data to be obtained. The threshold value determination unit 320 holds a table shown in FIG. 6, refers to the table, and selects the first threshold value corresponding to the quantization width determined by the quantization width determination unit 310. The quantization width change unit 220 causes the quantization unit 106 to use the quantization width determined by the quantization width determination unit 310. The I_PCM judgment unit 120 compares a cost with a first threshold value determined by the threshold value determination unit 320, and the quantization unit 106 performs quantization processing with the quantization width based on the control of the quantization width change unit 220. As described above, when the I_PCM judgment unit 120 selects either coded data or I_PCM data as data to be outputted to outside the picture coding device 30, it makes a selection in consideration of not only the cost but also the quantization width. With this, it is possible to produce an effect closer to the one when selection of data is performed using the actually obtained amount of code.

As shown in FIG. 7, the picture coding device 30 may be replaced with a picture coding device 40. The picture coding device 40 includes a variance calculation unit 420 in addition to the components that the picture coding device 30 includes. The variance calculation unit 420 calculates a variance of the luminance of macroblocks to be coded composed of input picture data. The threshold value determination unit 320 determines a first threshold value according to the luminance variance obtained by the variance calculation unit 420 as well. This makes it possible to determine the appropriate first threshold value with consideration for not only luminance but also chrominance. The variance calculation unit 420 may calculate a variance of the chrominance of the macroblocks to be coded, and the threshold value determination unit 320 may determine the first threshold value according to the chrominance variance obtained by the variance calculation unit 420 as well.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A picture coding device of the invention is useful as a device that codes picture data.

What is claimed is:

1. A picture coding device that codes picture data by performing pipeline processing, said picture coding device comprising:
   a motion prediction unit operable to receive an input image, operable to select a reference image for which a sum of absolute differences between pixels of the input image and pixels of the reference image is smallest, and operable to detect a motion vector of the input image with respect to the selected reference image;
   an intra picture prediction unit operable to receive the input image, operable to select a prediction image for which a sum of absolute differences between the pixels of the input image and pixels of the prediction image is the smallest, and operable to specify a prediction mode for generating the selected prediction image;
   an input selection unit operable to select a smaller one of a motion total and an intra picture total, the motion total being obtained by adding a motion residual, which indicates a difference between the input image and the reference image, and a value into which the motion vector is coded and the intra picture total being obtained by adding an intra picture residual, which indicates a difference between the input image and the prediction image, and a value into which the prediction mode is coded;
   an orthogonal transformation unit operable to obtain a first value by orthogonally transforming a differential image, the differential image being formed using a difference (i) between the pixels of the input image and the pixels of the reference image when the motion total is selected by said input selection unit and (ii) between the pixels of the input image and the pixels of the prediction image when the intra picture total is selected by said input selection unit;
   a quantization unit operable to obtain a second value by quantizing the first value obtained by said orthogonal transformation unit;
   a binarization unit operable to obtain binary data by binarizing the second value obtained by said quantization unit;
   an arithmetic coding unit operable to obtain coded data by arithmetically coding the binary data obtained by said binarization unit;
   a buffer holding I_PCM data corresponding to the input image;
   a comparison unit operable to compare a cost with a first threshold value before said binarization unit binarizes the second value obtained by said quantization unit, the cost being the smaller one of the motion total and the intra picture total;
   an output selection unit arranged between said quantization unit and said binarization unit, said output selection unit being operable to receive the second value obtained by said quantization unit and the I_PCM data from said buffer, being operable to select (i) the received second value obtained by said quantization unit when the cost is equal to or less than the first threshold value and (ii) the received I_PCM data when the cost is larger than the first threshold value, and being operable to output a result of the selection as a selection result, the selection result being output to said binarization unit when the second value is selected by said output selection unit; and
   an output unit operable to output to outside said picture coding device, as data to be outputted, one of the coded data obtained by said arithmetic coding unit and the received I_PCM data, based on the result of the selection performed by said output selection unit, such that said output unit outputs the coded data when the second value is selected by said output selection unit and when the cost is equal to or less than the first threshold value and such that said output unit outputs the received I_PCM data when the received I_PCM data is selected by said output selection unit and when the cost is larger than the first threshold value.

2. The picture coding device according to claim 1, further comprising:
   a quantization width change unit operable to compare the cost with a second threshold value that is smaller than the first threshold value and operable to increase a quantization width used by said quantization unit when the cost is larger than the second threshold value and the cost is equal to or less than the first threshold value,
   wherein said quantization unit is operable to quantize the first value obtained by said orthogonal transformation unit using the quantization width based on a control of said quantization width change unit.

3. The picture coding device according to claim 1, further comprising:
   a quantization width determination unit operable to compare an amount of the binary data obtained by said binarization unit with a third threshold value and operable to determine a quantization width used by said quantization unit, the quantization width being determined based on a relationship between the amount of binary data and the third threshold value; and
   a threshold value determination unit operable to determine the first threshold value based on the quantization width determined by said quantization width determination unit,
   wherein said comparison unit is operable to compare the cost with the first threshold value determined by said threshold value determination unit, and
   wherein said quantization unit is operable to quantize the first value obtained by said orthogonal transformation unit using the quantization width determined by said quantization width determination unit.

4. The picture coding device according to claim 3, further comprising:
   a variance calculation unit operable to obtain a third value by calculating at least one of a luminance variance of the input image and a chrominance variance of the input image,
   wherein said threshold value determination unit is operable to determine the first threshold value using the third value obtained by said variance calculation unit.

5. The picture coding device according to claim 3, wherein the threshold value determination unit stores a table used to determine the first threshold value based on the determined quantization width.

6. A picture coding method of performing pipeline processing via a picture coding device to code picture data, the picture coding method comprising:
  receiving an input image;
  selecting a reference image for which a sum of absolute differences between pixels of the input image and pixels of the reference image is smallest;
  detecting a motion vector of the input image with respect to the selected reference image;
  selecting a prediction image for which a sum of absolute differences between the pixels of the input image and pixels of the prediction image is the smallest;
  specifying a prediction mode for generating the selected prediction image;
  selecting a smaller one of a motion total and an intra picture total, the motion total being obtained by adding a motion residual, which indicates a difference between the input image and the reference image, and a value into which the motion vector is coded and the intra picture total being obtained by adding an intra picture residual, which indicates a difference between the input image and the prediction image, and a value into which the prediction mode is coded;
  obtaining a first value by orthogonally transforming a differential image, the differential image being formed using a difference (i) between the pixels of the input image and the pixels of the reference image when the motion total is selected by said selecting of the smaller one of the motion total and the intra picture total and (ii) between the pixels of the input image and the pixels of the prediction image when the intra picture total is selected by said selecting of the smaller one of the motion total and the intra picture total;
  obtaining a second value by quantizing the first value obtained by said orthogonally transforming of the differential image;
  obtaining binary data by binarizing the second value obtained by said quantizing; and
  obtaining coded data by arithmetically coding the binary data obtained by said binarizing;
  wherein a comparing step is performed before said binarizing binarizes the second value obtained by said quantizing, said comparing step including comparing a first threshold value with a cost, the cost being the smaller one of the motion total and the intra picture total,
  wherein a selection step is performed between said quantization and said binarization, said selection step including receiving the second value obtained by said quantizing, receiving I_PCM data corresponding to the input image, selecting (i) the received second value when the cost is equal to or less than the first threshold value and (ii) the received I_PCM data when the cost is larger than the first threshold value, and outputting a result of the selection as a selection result to said binarization when the second value is selected by said selection step, and
  wherein the picture coding method includes an outputting step of outputting to outside the picture coding device, as data to be outputted, one of the coded data obtained by said arithmetically coding and the received I_PCM data, based on the result of the selection performed by said selection step, such that said outputting step outputs the coded data when the second value is selected by said selection step and when the cost is equal to or less than the first threshold value and such that said outputting step outputs the received I_PCM data when the received I_PCM data is selected by said selection step and when the cost is larger than the first threshold value.

7. The picture coding method according to claim 6, further comprising:
  comparing the cost with a second threshold value that is smaller than the first threshold value;
  increasing a quantization width used by said quantizing to quantize the first value when the cost is larger than the second threshold value and the cost is equal to or less than the first threshold value; and
  quantizing the first value obtained by said orthogonally transforming using the increased quantization width.

8. The picture coding method according to claim 6, further comprising:
  comparing an amount of the binary data obtained by said binarizing with a third threshold value;
  determining a quantization width used by said quantizing, the quantizing width being determined based on a relationship between the amount of binary data and the third threshold value; and
  determining the first threshold value based on the determined quantization width,
  wherein the cost is compared with the determined first threshold value, and
  wherein the first value obtained in said orthogonally transforming is quantized by said quantizing using the determined quantization width.

9. The picture coding method according to claim 8, further comprising:
  obtaining a third value by calculating at least one of a luminance variance of the input image and a chrominance variance of the input image,
  wherein said determining of the first threshold value determines the first threshold value using the obtained third value.

10. The picture coding method according to claim 8, wherein the first threshold value is determined by using a table storing corresponding threshold values and quantization widths.

11. A non-transitory computer-readable recording medium having a program recorded thereon, the program causing a picture coding device to code picture data by performing pipeline processing, and the program causing a computer to execute a method comprising:
  receiving an input image;
  selecting a reference image for which a sum of absolute differences between pixels of the input image and pixels of the reference image is smallest;
  detecting a motion vector of the input image with respect to the selected reference image;
  selecting a prediction image for which a sum of absolute differences between the pixels of the input image and pixels of the prediction image is the smallest;
  specifying a prediction mode for generating the selected prediction image;
  selecting a smaller one of a motion total and an intra picture total, the motion total being obtained by adding a motion residual, which indicates a difference between the input image and the reference image, and a value into which the motion vector is coded and the intra picture total being obtained by adding an intra picture residual, which indicates a difference between the input image and the prediction image, and a value into which the prediction mode is coded;

obtaining a first value by orthogonally transforming a differential image, the differential image being formed using a difference (i) between the pixels of the input image and the pixels of the reference image when the motion total is selected by said selecting of the smaller one of the motion total and the intra picture total and (ii) between the pixels of the input image and the pixels of the prediction image when the intra picture total is selected by said selecting of the smaller one of the motion total and the intra picture total;

obtaining a second value by quantizing the first value obtained by said orthogonally transforming of the differential image;

obtaining binary data by binarizing the second value obtained by said quantizing; and obtaining coded data by arithmetically coding the binary data obtained by said binarizing;

wherein a comparing step is performed before said binarizing binarizes the second value obtained by said quantizing, said comparing step including comparing a first threshold value with a cost, the cost being the smaller one of the motion total and the intra picture total, wherein a selection step is performed between said quantization and said binarization, said selection step including receiving the second value obtained by said quantizing, receiving I_PCM data corresponding to the input image, selecting (i) the received second value when the cost is equal to or less than the first threshold value and (ii) the received I_PCM data when the cost is larger than the first threshold value, and outputting a result of the selection as a selection result to said binarization when the second value is selected by said selection step, and wherein the picture coding method includes an outputting step of outputting to outside the picture coding device, as data to be outputted, one of the coded data obtained by said arithmetically coding and the received I_PCM data, based on the result of the selection performed by said selection step such that said outputting step outputs the coded data when the second value is selected by said selection step and when the cost is equal to or less than the first threshold value and such that said outputting step outputs the received I_PCM data when the received I_PCM data is selected by said selection step and when the cost is larger than the first threshold value.

12. The non-transitory computer-readable recording medium according to claim 11, wherein the method further comprises:

comparing the cost with a second threshold value that is smaller than the first threshold value;

increasing a quantization width used by said quantizing to quantize the first value when the cost is larger than the second threshold value and the cost is equal to or less than the first threshold value; and quantizing the first value obtained by said orthogonally transforming using the increased quantization width.

13. The non-transitory computer-readable recording medium according to claim 11, wherein the method further comprises:

comparing an amount of the binary data obtained by said binarizing with a third threshold value;

determining a quantization width used by said quantizing, the quantizing width being determined based on a relationship between the amount of binary data and the third threshold value; and determining the first threshold value based on the determined quantization width, wherein the cost is compared with the determined first threshold value, and wherein the first value obtained in said orthogonally transforming is quantized by said quantizing using the determined quantization width.

14. The non-transitory computer-readable recording medium according to claim 13, wherein the method further comprises obtaining a third value by calculating at least one of a luminance variance of the input image and a chrominance variance of the input image, and wherein said determining of the first threshold value determines the first threshold value using the obtained third value.

15. The non-transitory computer-readable recording medium according to claim 13, wherein the first threshold value is determined by using a table storing corresponding, threshold values and quantization widths.

16. An integrated circuit comprising:

a motion prediction unit operable to receive an input image, operable to select a reference image for which a sum of absolute differences between pixels of the input image and pixels of the reference image is smallest, and operable to detect a motion vector of the input image with respect to the selected reference image;

an intra picture prediction unit operable to receive the input image, operable to select a prediction image for which a sum of absolute differences between the pixels of the input image and pixels of the prediction image is the smallest, and operable to specify a prediction mode for generating the selected prediction image;

an input selection unit operable to select a smaller one of a motion total and an intra picture total, the motion total being obtained by adding a motion residual, which indicates a difference between the input image and the reference image, and a value into which the motion vector is coded and the intra picture total being obtained by adding an intra picture residual, which indicates a difference between the input image and the prediction image and a value into which the prediction mode is coded;

an orthogonal transformation unit operable to obtain a first value by orthogonally transforming a differential image, the differential image being formed using a difference (i) between the pixels of the input image and the pixels of the reference image when the motion total is selected by the input selection unit and (ii) between the pixels of the input image and the pixels of the prediction image when the intra picture total is selected by said input selection unit;

a quantization unit operable to obtain a second value by quantizing the first value obtained by said orthogonal transformation unit;

a binarization unit operable to obtain binary data by binarizing the second value obtained by said quantization unit;

an arithmetic coding unit operable to obtain coded data by arithmetically coding the binary data obtained by said binarization unit;

a buffer holding I_PCM data corresponding to the input image;

a comparison unit operable to compare a cost with a first threshold value before said binarization unit binarizes the second value obtained by said quantization unit, the cost being the smaller one of the motion total and the intra picture total;

an output selection unit arranged between said quantization unit and said binarization unit, said output selection unit being operable to receive the second value obtained by said quantization unit and the I_PCM data from said buffer, being operable to select (i) the received second value obtained by said quantization unit when the cost is equal to or less than the first threshold value and (ii) the received I_PCM data when the cost is larger than the first threshold value, and being operable to output a result of the selection as a selection result, the selection result being output to said binarization unit when the second value is selected by said output selection unit; and an output unit operable to output to outside said integrated circuit, as data to be outputted, one of the coded data obtained by said arithmetic coding unit and the received I_PCM data, based on the result of the selection performed by said output selection unit, such that said output unit outputs the coded data when the second value is selected by said output selection unit and when the cost is equal to or less than the first threshold value and such that said output unit outputs the received I_PCM data when the received I_PCM data is selected by said output selection unit and when the cost is larger than the first threshold value.

17. The integrated circuit according to claim 16, further comprising:

a quantization width change unit operable to compare the cost with a second threshold value that is smaller than the first threshold value and operable to increase a quantization width used by said quantization unit when the cost is larger than the second threshold value and the cost is equal to or less than the first threshold value, wherein said quantization unit is operable to quantize the first value obtained by said orthogonal transformation unit using the quantization width based on a control of said quantization width change unit.

18. The integrated circuit according to claim 16, further comprising:

a quantization width determination unit operable to compare an amount of the binary data obtained by said binarization unit with a third threshold value and operable to determine a quantization width used by said quantization unit, the quantization width being determined based on a relationship between the amount of binary data and the third threshold value; and a threshold value determination unit operable to determine the first threshold value based on the quantization width determined by said quantization width determination unit, wherein said comparison unit is operable to compare the cost with the first threshold value determined by said threshold value determination unit, and wherein said quantization unit is operable to quantize the first value obtained by said orthogonal transformation unit using the quantization width determined by said quantization width determination unit.

19. The integrated circuit according to claim 18, further comprising:

a variance calculation unit operable to obtain a third value by calculating at least one of a luminance variance of the input image and a chrominance variance of the input image, wherein said threshold value determination unit is operable to determine the first threshold value using the third value obtained by said variance calculation unit.

20. The integrated circuit according to claim 18, wherein the threshold value determination unit stores a table used to determine the first threshold value based on the determined quantization width.

* * * * *